United States Patent Office 2,751,627
Patented June 26, 1956

2,751,627

PROCESS FOR PRODUCING CELLULAR THERMOPLASTIC BODIES

Herbert Lindemann, Sins, Switzerland, assignor to Lonza Electric and Chemical Works Ltd., Gampel, Switzerland No Drawing. Application November 25, 1952, Serial No. 322,586

Claims priority, application Switzerland November 29, 1951

11 Claims. (Cl. 18—48)

The present invention relates to a process for producing cellular thermoplastic bodies and more particularly to a process for producing cellular thermoplastic bodies which are fully expanded and have a minimum of tension in the cell walls of said thermoplastic bodies.

The process for producing cellular bodies with closed cells from thermoplastic masses comprised forcing gas under pressure into a thermoplastic mass so that the gas is either dissolved or finely divided therein; cooling and reducing the pressure in the mold containing the thermoplastic mass; removing the gas-containing thermoplastic mass from the mold whereby a first expansion of about 2–4 times the original volume of the thermoplastic mass takes place and an intermediate product of a crude cellular body is formed. This crude cellular body contains gas in closed cells therein, the contained gas being at a superatmospheric pressure of 2–9 atm. The final expansion of this intermediate crude cellular body, to about 10–20 times the volume of the original thermoplastic mass, was carried out in the usual manner by heating the body, for example in a heating chamber or by means of hot air, the final heating and expanding always taking place at normal or atmospheric pressure. By heating, the mass becomes plastic and ductile so that the pressure of the gas in the gas containing cell stretches and expands the cellular body.

It is an object of the present invention to provide a process for treating the intermediate crude cellular body so as to prevent loss of the gas contained therein, thereby utilizing all of the gas contained in the body for expanding the same to its final form.

It is another object of the present invention to provide a process wherein thermoplastic cellular bodies containing a large proportion of plasticizer and/or solvent, may be expanded to a stable final form.

It is a further object of the present invention to provide a process for uniformly heating the intermediate cellular body containing gas under superatmospheric pressure before finally expanding the cellular body.

It is a still further object of the present invention to provide a process wherein the loss of solvent and/or plasticizer during the expansion of the cellular body is considerably reduced so that the cellular body remains soft during expansion.

With the above object in view, the present invention mainly consists in forming a cellular thermoplastic body having all cells closed and filled with gas at higher than atmospheric pressure; heating said gas-containing thermoplastic body under applied superatmospheric pressure so as to uniformly heat said thermoplastic body throughout while preventing substantial expansion of the same and preventing substantial loss of the gas, and the solvent and/or plasticizer contained in the thermoplastic body; reducing the pressure and expanding said gas-containing thermoplastic body at substantially atmospheric pressure so as to form a gas-expanded cellular thermoplastic body.

The superatmospheric pressure applied to the intermediate thermoplastic body having closed gas-containing cells, the gas contained in said cells being under superatmospheric pressure, may be lower, equal to or higher than the superatmospheric pressure of the gas in the gas-containing cells of the intermediate thermoplastic body. Preferably a superatmospheric pressure of 2–9 kg./cm.$^2$ is applied to the intermediate thermoplastic body.

The pressure may be applied by means of mechanical pressure, with a press or by means of aeriform fluid pressure or by means of a liquid pressure whereby an indifferent liquid is used which does not react with the thermoplastic masses or the plasticizers and/or the solvents and which does not form a gas at the applied temperatures. Advantageously the pressure may be applied in an autoclave. Preferably, the pressure is applied by means of an aeriform fluid which is the same as the gas contained in the gas-containing cells of the intermediate cellular body. For example, where the gas forced into the cellular body was originally nitrogen gas, it is preferable to apply the superatmospheric gas pressure in an autoclave on the intermediate body with nitrogen gas. It is a preferred embodiment of the present invention that the intermediate cellular body containing gas under superatmospheric pressure in gas-containing cells, are heated at a temperature of 40–70° C. below the temperature at which the thermoplastic body gelatinizes. It is further preferable that the final expansion of the intermediate cellular body, which has been treated under pressure according to the present invention, is carried out at a temperature above room temperature and 40–70° C. below the gelatinisation temperature of the thermoplastic body. Which special temperature most advantageously has to be applied for the particular thermoplastic body depends upon the constituents thereof and may be determined by simple pre-testing for any particular body.

In special cases e. g. if the thermoplastic body has to be strongly expanded the cellular body may be heated at a temperature above the range just mentioned. However this temperature must be below the temperature at which the cellular structure of the body would be destroyed.

A complete process according to the present invention comprises heating a thermoplastic mass in a mold while exposing said thermoplastic mass to a gaseous medium under pressure so as to force gas into said thermoplastic mass, thereby forming a gas-containing thermoplastic body; cooling said gas-containing thermoplastic body; reducing the pressure in said mold; removing said cooled gas-containing thermoplastic body from said mold so as to cause the same to expand and form an intermediate cellular thermoplastic body having all cells closed and filled with gas at higher than atmospheric pressure; heating said gas-containing thermoplastic body under applied superatmospheric pressure so as to uniformly heat said thermoplastic body throughout while preventing substantial expansion of the same and preventing undue loss of gas from the gas-containing cells; reducing the pressure and expanding said gas-containing thermoplastic body at substantially atmospheric pressure so as to form a gas-expanded cellular thermoplastic body.

The original thermoplastic mass may be treated with a blowing agent such as a nitrogen gas, so as to cause gas to be occluded or dissolved in the thermoplastic mass. In the event that a nitrogen gas blowing agent is employed in the original treatment, it is preferable to employ nitrogen gas in the autoclave. The final expansion may be carried out until the gas contained in the gas-containing cells is substantially at atmospheric pressure.

It has been found that by expanding the intermediate crude cellular body according to the known processes without the pre-treatment under superatmospheric pressure of the present invention, a considerable loss of gas and of plasticizer and/or solvent from the cellular body takes place so that the final expansion of the cellular body is disadvantageous. The loss of gas is disadvantageous in that a portion of the gas is lost before the final expansion of the cellular body so that not all of the original gas in the cellular body is utilized for expansion of the same. It is therefore impossible to obtain in this manner cellular bodies which are as light as they should be, considering the amount of gas originally forced into the cellular body.

The loss of plasticizer and/or solvent has other disadvantages for the producing of cellular bodies. Where it is desirable to obtain a temporary softening to further the dissolving, solvents are added to the thermoplastic materials. In such case the solvent acts much like plasticizer. Therefore, a thermoplastic body such as of polyvinylchloride, containing a large amount of solvent or plasticizer, is considerably more yieldable than the same material which does not contain such large quantity of solvent or plasticizer. If a crude intermediate cellular body is warmed after being freshly taken out of the mold in the usual warming chamber with circulating air, not only is gas lost but also plasticizer and solvent is evaporated and quickly drawn off. Such heating chambers in fact had changes of air alternately for the purpose of creating better air circulation, which caused even greater loss of solvent and plasticizer. This fault is removed by the use of a closed room such as an autoclave with additional gas pressure.

It is advantageous to provide pressure and the addition of solvent and/or plasticizer to a higher degree than was previously used in order to produce special effects. The addition of the solvent and/or plasticizer, with the use of high pressure, is additionally advantageous in causing homogeneous expansion of the final thermoplastic body.

Before the process of the present invention, the heating of the crude intermediate thermoplastic body to cause the final expansion of the same, caused evaporation of the solvent or plasticizer from the outer surface of the thermoplastic body with a relatively little evaporation of the solvent or plasticizer from the inner part of the thermoplastic body. Such an evaporation of the solvent or plasticizer from the outer portions of the thermoplastic body caused the same to be deformed upon final expansion and further caused the final expanded product to have a higher specific gravity than should have been produced by the amount of gas originally used. The tension of the outer surface of a thermoplastic body prepared according to the old processes was much greater than the tension in the inner part of the body. Such cellular body therefore has too great a tension from the gas pressure in the inner part thereof than can be held back by the outer surface. This causes deformation of the body upon standing. It was in fact impossible to produce smooth, uniform products according to the usual process of expanding the intermediate thermoplastic body by warming the same at normal pressures.

The loss of solvent during the expansion in the heating chamber prevents the stretching of the thermoplastic mass to such an extent that an overpressure of gas remains in the cells of the cellular body which may be 0.3–0.5 atm. greater than atmospheric pressure. Not only are volatile solvents lost by the prior processes, but also a portion of the plasticizer is lost by warming the cellular body on the outer surface thereof. This loss of plasticizer causes a proportionate loss in softness and elasticity of the cellular body.

The present invention removes all of the above described difficulties and prevents loss of solvent and plasticizer with proportionate prevention of deformation of the final cellular body. These difficulties are prevented by the process of heating the intermediate cellular body containing gas which is under superatmospheric pressure, under applied superatmospheric pressure so as to uniformly heat the intermediate cellular body throughout while preventing substantial expansion of the same and loss of softening agent and/or plasticizer through evaporation. This uniformly heated intermediate cellular body is then expanded by reducing the pressure at normal or atmospheric pressure.

The applied pressure may be less than, equal to or greater than the gas pressure in the cells of the cellular body. However, when the applied pressure is less than the gas pressure in the cells of the cellular body, it must nevertheless be greater than atmospheric pressure. The use of applied pressure while warming the cellular body prevents the loss of gas by diffusion from the cellular body and the loss of solvents and/or plasticizer by evaporation from the cellular body.

The pressure which is applied to the cellular body while heating the same may be applied in any manner, such as gas or a mixture of a gas and vapor pressure of the solvent contained in the mass in an autoclave, mechanical pressure by means of presses, etc. If the intermediate cellular body has been gassed with nitrogen, it is preferable to apply nitrogen pressure or air pressure in the autoclaves, though any type of pressure may be applied. The heating of the cellular body and of the pressure medium may be carried out in any manner such as by hot air, steam, hot liquid, electrical heating, infrared rays, etc.

The intermediate cellular body is warmed to expand the same at temperatures which are preferably below the gelatinization temperature of the cellular body, for example polyvinylchloride cellular bodies are warmed between 100 and 120° C., though care should always be taken to heat the cellular body at temperatures below the temperature at which the same will be deformed by the heat; i. e. for polyvinylchloride bodies containing about 30% plasticizer, the heating should be no higher than 140° C. The intermediate cellular body is heated under the applied pressure, which may be called a counter-pressure because it counters the pressure of the gas in the gas-containing cells of the cellular body, until the cellular body is uniformly heated throughout. The period of heating depends on the thickness of the cellular body. If after heating the cellular body under gas pressure, the pressure in the autoclave is released, without change in temperature, the cellular body expands to a higher degree than can be accomplished by known methods, thereby resulting in a cellular body having a lower specific gravity than could be produced by the known methods.

By the previous methods of warming cellular bodies in a heating chamber at normal pressure, it was only possible to obtain cellular bodies with a specific gravity of about 0.04. With the aid of the applied counter pressure which prevents loss of gas, solvent and/or plasticizer, it is possible to obtain cellular bodies having a specific gravity of 0.02. In this way very light cellular bodies may be produced. If a hard cellular body is produced without any plasticizer, the gas will be dissolved in the mass by addition of solvents. The solvent operates as a plasticizer during the expansion of the cellular body and allows for a large expansion of the same.

The advantages of the present invention are the production of cellular bodies having a lower specific gravity, the minimizing of the loss of solvent and/or plasticizer and the production of highly expanded cellular bodies while using a lesser amount of solvent than hitherto possible.

If the finally expanded soft cellular bodies are still unstable in form, the bodies will after a time shrink and deform. This may be prevented by an additional stabilizing treatment.

This stabilizing treatment consists in again warming the cellular body, so that after cooling, the gas pressure within the cellular body is substantially the same as atmospheric pressure. Thereby, shrinking because of too high a gas pressure in the cells of a cellular body cannot take place. This is especially important where the cellular body contains a large amount of solvent or softening agent. By the present invention it is also possible to carry out the expansion on such conditions of pressure and temperature, to obtain after cooling a cellular body, the gas pressure within the cells being atmospheric, thus preventing any tension within the cellwalls caused by the overpressure.

The process of the present invention may be used for any thermoplastic bodies which may or may not contain a solvent and/or plasticizer or mixtures of solvents and/or plasticizer. The intermediate cellular body may be gassed in any known manner, i. e. by applying gas under pressure, by the use of a blowing agent or both, etc. The final expansion of the intermediate cellular body, which has been warmed under applied pressure until it is uniformly warmed throughout takes place as soon as the pressure is released.

The method of the invention may be applied to other thermoplastic materials besides polyvinylchloride such as copolymers of vinylchloride containing a major portion of copolymerized vinylchloride, mixtures of polyvinylchloride with other thermoplastic resins, polyvinyl butyrate, polyvinyl acetate, polyvinyl alcohol, polyvinyl acetals such as polyvinyl formal, polyvinyl butyral, etc., polyvinylidene chloride, copolymers of vinylidene, chloride and vinylchloride, polyvinyl aromatic compounds such as polystyrene, polydichlorostyrene, polyalphamethylstyrene etc., and acrylic compounds such as polymethylacrylate, polyethylacrylate, polymethyl methacrylate, etc. The thermoplastic resins may be used with or without plasticizers and/or solvents.

The solvents which may be used include acetone, methylethyl ketone, ethyl acetate, etc. As illustrative of the plasticizers that may be used are the following: dioctylphthalate, dibutylphthalate, dimethylphthalate, tricresyl phosphate, etc. Any of these plasticizers or mixtures of them may be employed with the process.

An excellent blowing agent which may be used in this process is azoisobutyric dinitrile. Other nitrogen-producing blowing agents which may be used are alpha, alpha' azobisiso-butyronitrile, diazoaminobenzene, 1,3-bis-(p-xenyl)-triazene, etc. Nitrogen-producing blowing agents are preferred; however, blowing agents which produce other gases such as ammonia or carbon dioxide may be employed. Commonly used blowing agents which produce these gases are for example, mixtures of ammonium chloride and sodium nitrite, etc. The thermoplastic cellular bodies made with blowing agents have often the property to increase the loss of gas by diffusion, so that the cellular bodies during the heating lose gases and do not expand sufficiently. By the present invention this disadvantage is avoided.

The following examples are given as preferred embodiments of the present invention, the scope of said invention not however being limited thereto.

Example I

A mixture of 50 parts by weight of well stabilized polyvinylchloride, 50 parts by weight dioctylphthalate and 20 parts by weight methylethyl ketone are mixed so as to form a fine powder. This is, in the customary manner, placed in a well closed mold and treated with 15 liters nitrogen gas per kg. of the final mixture with a pressure of about 250 kg./cm.² The mixture is gelatinized, then the pressure somewhat released, then the mold with the gelatinized mass cooled and the body removed from the mold at atmospheric pressure. The body expands to about 4 times the original volume thereof and the body contains cells in which the gas is under a pressure of about 10 atm.

This intermediate cellular body is then placed in an autoclave and a counterpressure of about 10 kg./cm.² of nitrogen gas is applied. The intermediate body is then warmed to 100° C. The heating of the cellular body does not cause it to expand to any substantial degree because of the applied pressure. Furthermore, the solvent is not evaporated during the warming and the final products therefore remain soft.

After the intermediate cellular body has been uniformly heated throughout while under applied counter-pressure, for about 60 minutes, the gas pressure in the autoclave is released and the intermediate cellular body allowed to expand freely. After cooling and evaporation of the solvent, the cellular body is found to have a specific gravity of about 0.06–0.07. This body is excellent for use in upholstery arrangements.

Example II

A mixture of 50 parts by weight of polyvinylchloride, or a copolymer thereof, 50 parts by weight dioctylphthalate and 20 parts by weight methylethyl ketone is mixed so as to form a fine powder. A mold is filled with this mixture and treated with 15 liters of nitrogen per kg. of final mixture, in the usual manner so as to force the gas into the mixture. The gas-containing mass is then in the usual manner gelatinized, cooled and removed from the mold. The intermediate cellular body is then warmed in an autoclave under applied counter-pressure of 5–6 atm. to about 90° C. After being uniformly warmed throughout, the pressure in the autoclave is released and the body is allowed to expand freely.

The thus produced cellular body is then given a stabilizing treatment as follows: the body is heated in a heating chamber at normal pressures to a temperature of about 100–110° C. for about 2–4 hours, whereby the body expands a little and then more or less shrinks. The solvent methylethyl ketone, is evaporated at the same time. The resulting cellular body is then cooled to room temperature. The thus produced body is stable in form and will not shrink further upon standing.

Example III

A mixture of 64 parts by weight of well stabilized polyvinylchloride, 36 parts by weight dioctylphthalate and 12 parts by weight ethyl acetate are treated with 10 liters per kg. of final mixture of a gas mixture containing 90 parts by volume hydrogen and 10 parts by volume nitrogen. The treatment is carried out as in Example I. The resulting intermediate cellular body has a specific gravity of about 0.12.

The applied gas counter pressure may be entirely nitrogen gas or a mixture of nitrogen and hydrogen in the proportions contained in the cells of the cellular body. The intermediate cellular body after expansion according to the process described in Example I is treated so as to stabilize the form of the body. The outer surface of the cellular body is removed or the cellular body is cut into thin sheets and allowed to stand at room temperature and/or treated at temperatures of 100–110° C. so that the same shrinks due to the escape of the hydrogen from the gas-containing cells. The final cellular body is tension-free, has a specific gravity of about 0.5 and is excellent for shoe soles.

Example IV

A mixture of 100 parts by weight of well stabilized polyvinyl chloride and 45 parts by weight of acetone is mixed to form a fine powder. This is treated as in Example I, but with 25 liters instead of 15 liters nitrogen per kg. of final mixture so as to form an intermediate cellular body. The intermediate cellular body is then treated as in Example I, thereby resulting in a hard cellular material after the evaporation of the solvent. This cellular material has a specific gravity of about 0.035 and is very useful as an insulating material.

Example V

A mixture of 50 parts by weight of polyvinylchloride, 50 parts by weight dioctylphthalate and about 12 parts by weight of a nitrogen-producing blowing agent, such as azoisobutyric dinitrile is prepared in the usual manner. The amount of blowing agent is such that in the final mixture about 15 liters of nitrogen gas per kg. of final mixture, is produced. This is treated in the normal manner by gelatinization, cooled and then removed from the mold. The mass expands on being removed from the mold to about 4 times its original volume.

It is then placed in an autoclave under nitrogen gas pressure of about 5 atm. and warmed. After being uniformly warmed throughout, the pressure in the autoclave is released and the body allowed to expand freely. The resulting cellular body has a specific gravity of about 0.070. By previous processes, without the heating of the intermediate body under pressure in an autoclave, it was only possible to obtain a final cellular body having a specific gravity of 0.09 when using the amount of blowing agent used in this example. The resulting cellular body may be used in upholstery.

Example VI

A mixture of 100 parts by weight polyvinylchloride, 40 parts by weight acetone and 20 parts by weight of azoisobutyric dinitrile is made and treated as in Example V. The intermediate cellular body is treated also as in Example V, by heat under a counter-pressure in an autoclave, and then expanded. After evaporation of the solvent, the resulting cellular body has a specific gravity of about 0.035 and may be used as an insulating material.

Example VII

A mixture of 64 parts by weight polyvinylchloride and 36 parts by weight dioctophthalate is mixed and treated with 8 parts by weight azoisobutyric dinitrile in the usual manner. The resulting intermediate cellular body is heated as in Example I in an autoclave and then allowed to expand. The resulting cellular body has a specific gravity of 0.12. According to previous processes, it would have required 10 parts by weight of the same blowing agent to result in a cellular body having the same specific gravity as the one produced hereunder.

Example VIII

A mixture of 64 parts by weight of polyvinylchloride, and 36 parts by weight dioctophthalate, as plasticizer, is treated with carbon dioxide gas in an amount of 10 liters carbon dioxide per kg. of final mixture. The intermediate cellular body is treated in an autoclave as in Example I and results in a cellular body having a specific gravity of 0.10.

The counter-pressure in the autoclave may be applied by nitrogen gas. The outer crust of the expanded cellular body is removed or the cellular body is cut into thin slices. The carbon dioxide gas escapes from the cellular body by diffusion and air goes into the cells. The resulting cellular material is stabilized by a heat treatment and has a specific gravity of 0.35.

Without further analysis, the foregoing will so fully reveal the gist of the present invention that others can by applying current knowledge readily adapt it for various applications without omitting features that, from the standpoint for prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process for producing a gas-expanded cellular thermoplastic body having closed cells, comprising, in combination the steps of heating a thermoplastic mass in a mold while exposing said thermoplastic mass to a gaseous medium under pressure so as to force gas into said thermoplastic mass, thereby forming a gas-containing thermoplastic body; cooling said gas-containing thermoplastic body; reducing the pressure in said mold; removing said cooled gas-containing thermoplastic body from said mold so as to cause the same to expand and form an intermediate cellular thermoplastic body having all cells closed and filled with gas at higher than atmospheric pressure; heating said gas-containing cellular thermoplastic body while applying superatmospheric pressure thereto so as to substantially uniformly heat said gas-containing cellular thermoplastic body throughout while preventing substantial expansion of the same; and reducing said applied superatmospheric pressure so as to expand said gas-containing thermoplastic body and form a gas-expanded cellular thermoplastic body.

2. A process for producing a gas-expanded cellular thermoplastic body having closed cells, comprising, in combination the steps of heating a thermoplastic mass including a blowing agent in a mold so as to cause said blowing agent to evolve a gas which is under superatmospheric pressure in said mold thus exposing said thermoplastic mass to a gaseous medium under pressure so as to force gas into said thermoplastic mass, thereby forming a gas-containing thermoplastic body; cooling said gas-containing thermoplastic body; reducing the pressure in said mold; removing said cooled gas-containing thermoplastic body from said mold so as to cause the same to expand and from an intermediate cellular thermoplastic body having all cells closed and filled with gas at higher than atmospheric pressure; heating said gas-containing cellular thermoplastic body while applying superatmospheric pressure thereto so as to substantially uniformly heat said gas-containing cellular thermoplastic body throughout while preventing substantial expansion of the same; and reducing said applied superatmospheric pressure so as to expand said gas-containing thermoplastic body and form a gas-expanded cellular thermoplastic body.

3. A process of producing dimensionally stable gas-expanded, closed-cell, cellular thermoplastic bodies, comprising the steps of subjecting a heated gelatinized thermoplastic resin mass to gas under pressure so as to form a gas-containing gelatinized thermoplastic resin mass in which the gas contained in said resin mass is under pressure; cooling said gas-containing resin mass; allowing said gas-containing resin mass to expand at approximately room temperature and atmospheric pressure so as to form an intermediate expanded closed-cell, gas-containing cellular thermoplastic resin body containing gas in said closed cells at higher than atmospheric pressure; heating said intermediate gas-containing cellular thermoplastic resin body while applying superatmospheric pressure thereto so as to substantially uniformly heat said intermediate gas-containing cellular body throughout while preventing substantial expansion of the same; and reducing said applied superatmospheric pressure and allowing said gas-containing cellular body to expand, thereby forming a dimensionally stable closed-cell, gas-containing, cellular thermoplastic body.

4. A process of producing dimensionally stable gas-expanded, closed-cell, cellular thermoplastic bodies, comprising the steps of subjecting a heated gelatinized thermoplastic resin mass to gas under pressure so as to form a gas-containing gelatinized thermoplastic resin mass in which the gas contained in said resin mass is under pressure; cooling said gas-containing resin mass; allowing said gas-containing resin mass to expand at approximately room temperature and atmospheric pressure so as to form an intermediate expanded closed-cell, gas-containing cellular thermoplastic resin body containing gas in said closed cells at higher than atmospheric pressure; heating said intermediate gas-containing cellular thermoplastic resin body while applying superatmospheric pressure thereto so as to substantially uniformly heat said intermediate gas-containing cellular body throughout while preventing substantial expansion of the same; and reducing said applied superatmospheric pressure to approximately atmospheric pressure and allowing said gas-containing cellular body to expand, thereby forming a dimensionally stable closed-cell, gas-containing, cellular thermoplastic body.

5. A process of producing dimensionally stable gas-expanded, closed-cell, cellular thermoplastic bodies, comprising the steps of subjecting a heated gelatinized thermoplastic resin mass to gas under pressure so as to form a gas-containing gelatinized thermoplastic resin mass in which the gas contained in said resin mass is under pressure; cooling said gas-containing resin mass; allowing said gas-containing resin mass to expand at approximately room temperature and atmospheric pressure so as to form an intermediate expanded closed-cell, gas-containing cellular thermoplastic resin body containing gas in said closed cells at higher than atmospheric pressure; heating said intermediate gas-containing cellular thermoplastic resin body while applying superatmospheric pressure of 2–9 kg./cm.$^2$ thereto so as to substantially uniformly heat said intermediate gas-containing cellular body throughout while preventing substantial expansion of the same; and reducing said applied superatmospheric pressure to approximately atmospheric pressure and allowing said gas-containing cellular body to expand, thereby forming a dimensionally stable closed-cell, gas-containing, cellular thermoplastic body.

6. A process of producing dimensionally stable gas-expanded, closed-cell, cellular thermoplastic bodies, comprising the steps of subjecting a heated gelatinized thermoplastic resin mass to gas under pressure so as to form a gas-containing gelatinized thermoplastic resin mass in which the gas contained in said resin mass is under pressure; cooling said gas-containing resin mass; allowing said gas-containing resin mass to expand at approximately room temperature and atmospheric pressure so as to form an intermediate expanded closed-cell, gas-containing cellular thermosplastic resin body containing gas in said closed cells at higher than atmospheric pressure; heating said intermediate gas-containing cellular thermoplastic resin body while applying aeriform fluid superatmospheric pressure of 2–9 kg./cm.$^2$ thereto so as to substantially uniformly heat said intermediate gas-containing cellular body throughout while preventing substantial expansion of the same; and reducing said applied superatmospheric pressure to approximately atmospheric pressure and allowing said gas-containing cellular body to expand, thereby forming a dimensionally stable closed-cell, gas-containing, cellular thermoplastic body.

7. A process of producing dimensionally stable gas-expanded, closed-cell, cellular thermoplastic bodies, comprising the steps of subjecting a heated gelatinized thermoplastic resin mass to gas under pressure so as to form a gas-containing gelatinized thermoplastic resin mass in which the gas contained in said resin mass is under pressure; cooling said gas-containing resin mass; allowing said gas-containing resin mass to expand at approximately room temperature and atmospheric pressure so as to form an intermediate expanded closed-cell, gas-containing cellular thermoplastic resin body containing gas in said closed cells at higher than atmospheric pressure; heating said intermediate gas-containing cellular thermoplastic resin body while applying aeriform fluid superatmospheric pressure of 2–9 kg./cm.$^2$ thereto so as to substantially uniformly heat said intermediate gas-containing cellular body throughout while preventing substantial expansion of the same, said aeriform fluid under superatmospheric pressure being the same as the gas contained in said gas-containing cells; and reducing said applied superatmospheric pressure to approximately atmospheric pressure and allowing said gas-containing cellular body to expand, thereby forming a dimensionally stable closed-cell, gas-containing, cellular thermoplastic body.

8. A process of producing dimensionally stable gas-expanded, closed-cell, cellular thermoplastic bodies, comprising the steps of subjecting a heated gelatinized thermoplastic resin mass to gas under pressure so as to form a gas-containing gelatinized thermoplastic resin mass in which the gas contained in said resin mass is under pressure; cooling said gas-containing resin mass; allowing said gas-containing resin mass to expand at approximately room temperature and atmospheric pressure so as to form an intermediate expanded closed-cell, gas-containing cellular thermoplastic resin body containing gas in said closed cells at higher than atmospheric pressure; heating said intermediate gas-containing cellular thermoplastic resin body while applying mechanical superatmospheric pressure of 2–9 kg./cm.$^2$ thereto so as to substantially uniformly heat said intermediate gas-containing cellular body throughout while preventing substantial expansion of the same; and reducing said applied superatmospheric pressure to approximately atmospheric pressure and allowing said gas-containing cellular body to expand, thereby forming a dimensionally stable closed-cell, gas-containing cellular thermoplastic body.

9. A process of producing dimensionally stable gas-expanded, closed-cell, cellular thermoplastic bodies, comprising the steps of subjecting a heated gelatinized thermoplastic resin mass to gas under pressure so as to form a gas-containing gelatinized thermoplastic resin mass in which the gas contained in said resin mass is under pressure; cooling said gas-containing resin mass; allowing said gas-containing resin mass to expand at approximately room temperature and atmospheric pressure so as to form an intermediate expanded closed-cell, gas-containing cellular thermoplastic resin body containing gas in said closed cells at higher than atmospheric pressure; heating said intermediate gas-containing cellular thermoplastic resin body at a temperature above room temperature and below the gelatinization temperature of said thermoplastic resin body while applying superatmospheric pressure thereto so as to substantially uniformly heat said intermediate gas-containing cellular body throughout while preventing substantial expansion of the same; and reducing said applied superatmospheric pressure and allowing said gas-containing cellular body to expand, thereby forming a dimensionally stable closed-cell, gas-containing, cellular thermoplastic body.

10. A process of producing dimensionally stable gas-expanded, closed-cell, cellular thermoplastic bodies, comprising the steps of subjecting a heated gelatinized thermoplastic resin mass to gass under pressure so as to form a gas-containing gelatinized thermoplastic resin mass in which the gas contained in said resin mass is under pressure; cooling said gas-containing resin mass; allowing said gas-containing resin mass to expand at approximately room temperature and atmospheric pressure so as to form an intermediate expanded closed-cell, gas-containing cellular thermoplastic resin body containing gas in said closed cells at higher than atmospheric pressure; heating said intermediate gas-containing cellular thermoplastic resin body while applying superatmospheric pressure thereto so as to substantially uniformly heat said intermediate gas-containing cellular body throughout while preventing substantial expansion of the same; and reducing said applied superatmospheric pressure and allowing said gas-containing cellular body to expand at a temperature above room temperature and below the gelatinization temperature thereof; thereby forming a dimensionally stable closed-cell, gas-containing, cellular thermoplastic body.

11. A process of producing dimensionally stable gas-expanded, closed cell, cellular thermoplastic bodies, comprising the steps of subjecting a heated gelatinized thermoplastic resin mass to gas under pressure so as to form a gas-containing gelatinized thermoplastic resin mass in which the gas contained in said resin mass is under pressure; cooling said gas-containing resin mass; allowing said gas-containing resin mass to expand at approximately room temperature and atmospheric pressure so as to form an intermediate expanded closed-cell, gas-containing cellular thermoplastic resin body containing gas in said closed cells at higher than atmospheric pressure; heating said intermediate gas-containing cellular thermoplastic resin body while applying superatmospheric pressure thereto at least equal to the pressure of the gas contained in said closed cells so as to substantially uniformly heat said intermediate gas-containing cellular body throughout while preventing substantial expansion of the same; and reducing said applied superatmospheric pressure and allowing said gas-containing cellular body to expand, thereby forming a dimensionally stable closed-cell, gas-containing cellular thermoplastic body.

References Cited in the file of this patent

UNITED STATES PATENTS

| | | |
|---|---|---|
| 2,525,965 | Smith | Oct. 17, 1950 |
| 2,531,665 | Booth | Nov. 28, 1950 |
| 2,590,156 | Carpentier | Mar. 25, 1952 |